United States Patent [19]

Magri

[11] Patent Number: 5,779,294
[45] Date of Patent: Jul. 14, 1998

[54] MOUNTING SYSTEM AND METHOD

[76] Inventor: Steven A. Magri, 29 Sullivan Rd., Hudson, N.H. 03051

[21] Appl. No.: 697,741

[22] Filed: Aug. 29, 1996

[51] Int. Cl.⁶ .............................. B44C 5/02; G09B 23/36
[52] U.S. Cl. .................... 294/61; 294/1.1; 428/542.4; 248/496; 434/296
[58] Field of Search ................. 294/1.1, 2, 19.1, 294/24, 61; 428/542.4, 913.3; 269/3, 4, 55, 909; 218/496, 544, 686; 434/296

[56] References Cited

U.S. PATENT DOCUMENTS

| | | | |
|---|---|---|---|
| 1,953,926 | 4/1934 | Cammen | 81/3 |
| 2,019,789 | 11/1935 | Mahannah | 113/99 |
| 2,483,114 | 9/1949 | Van Schoor et al. | 248/496 |
| 2,586,636 | 2/1952 | Fischer et al. | 81/25 |
| 2,620,003 | 12/1952 | Perdue, Jr. | 146/218 |
| 2,881,816 | 4/1959 | Batt | 146/216 |
| 3,027,670 | 4/1962 | Kramer et al. | 428/542.4 |
| 3,868,757 | 3/1975 | Abbo | 29/200 H |
| 4,116,015 | 9/1978 | Duncan | 405/169 |
| 4,202,540 | 5/1980 | Neff | 269/166 |
| 4,458,873 | 7/1984 | Sutherland | 248/496 |
| 4,464,440 | 8/1984 | Dotzman | 434/296 |
| 4,602,757 | 7/1986 | Signorelli | 248/231.1 |
| 4,717,626 | 1/1988 | Badger | 434/296 |
| 4,930,759 | 6/1990 | Potter et al. | 269/54.5 |
| 5,033,708 | 7/1991 | Brue et al. | 248/309.2 |
| 5,248,121 | 9/1993 | Harrington | 248/477 |
| 5,322,739 | 6/1994 | Stagl | 428/542.4 |

OTHER PUBLICATIONS

Van Dyke Supply Co., Fish Supplies, No Date.
Van Dyke Supply Co., Supplies for Mounting, No Date.
Van Dyke Supply Co., pp. 230 and 237 No Date.
John Rinehart Taxidermy Supply Co., pp. 58, No Date.

*Primary Examiner*—Dean Kramer
*Attorney, Agent, or Firm*—Daniel J. Bourque; Kevin J. Carroll

[57] ABSTRACT

A mounting system and method includes a mounting device for handling an object during treatment or preparation and for mounting the object to a display member for displaying the object. The mounting system and method is particularly suited for use by a taxidermist to handle and mount a fish or other animal prepared by the taxidermist. The mounting device includes a mounting plug adapted to be received in a recessed region in the display member. One or more object engaging members extend from the mounting plug to engage and secure the object. A mounting rod extends from a second end of the mounting plug and includes a gripping region, for easy gripping and handling by a user. The mounting method includes inserting the mounting rod through an aperture in the display member so that the mounting plug is received into the recessed region in the display member. A fastener is then engaged with a fastener engaging region on the mounting rod to secure the mounting device to the display member. In one example, a hanger is provided on the mounting rod against a rear surface of the display member and the mounting rod is severed proximate the hanger to allow the hanger to lie against a flat surface, for easily hanging and displaying.

36 Claims, 6 Drawing Sheets

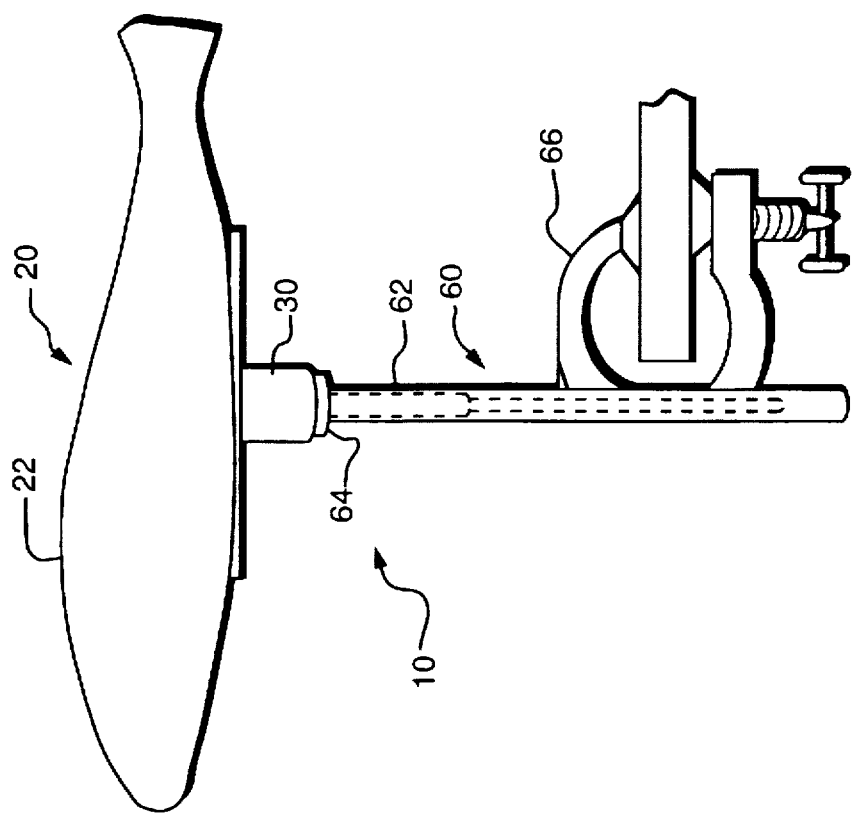
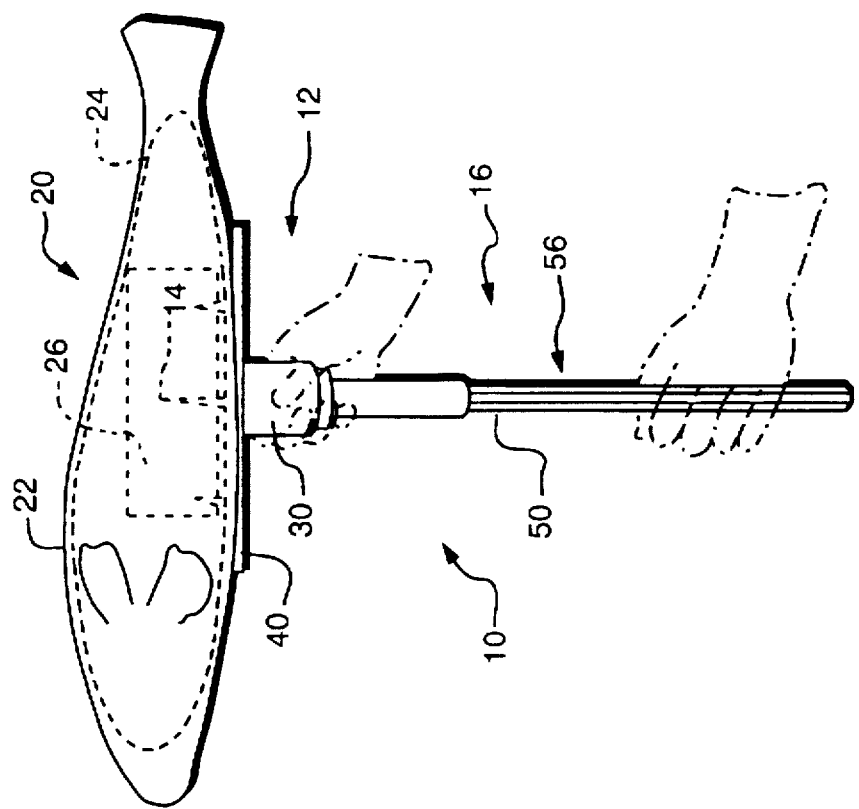

MOUNTING SYSTEM AND METHOD

FIELD OF THE INVENTION

The present invention relates to a system and method for both holding and handling an object and mounting the object to a mounting surface and in particular, to a system and method for mounting an animal prepared by a taxidermist.

BACKGROUND OF THE INVENTION

Decorative and hand carved, painted or other objects to be prepared and displayed must often be handled while treating or preparing the objects prior to mounting the objects for display. Mounting devices and systems exist for mounting various types of objects for different applications. However, no mounting system and method exist that both mount the object for easily handling during treatment or preparation and mount the object for display.

In the field of taxidermy, for example, a fish or other animal is cleaned and fitted with an insert (i.e. "stuffed") and then mounted so that the fish or animal can be painted and/or treated. The fish or animal must then be mounted to the desired display member, such as a plaque or driftwood, so that the fish or animal can be displayed. In the past, the fish or other animal was mounted to a plate on a mounting stand using long screws which are inserted into the "mount" after which the fish or animal is painted or treated while secured to the mounting stand. After waiting a significant period of time for the fish or other animal to dry, the object has to be removed from the plate and mounted directly to the plaque or driftwood, using screws and/or wires that go through the plaque or driftwood and directly into the fish.

A number of problems have been encountered using these conventional systems and methods for mounting fish or other animals. The existing mounting stands do not allow for the object to be easily handled and positioned while painting or treating the object. Also, once the object has been painted or treated, one must wait for the object to dry before further mounting the object to a plaque or driftwood because the object must be removed from the plate and must be directly handled when mounting to the plaque or driftwood. This multiple handling of the object is often detrimental to delicately stuffed and painted objects.

Further, existing methods of mounting an object to the plaque or driftwood using wires extending from the fish through the plaque or driftwood are awkward and tedious. Such mounting methods limit the positioning of the fish on the mounting surface and adversely affect how the fish looks on display.

Accordingly, what is needed is a mounting system and method that allows an object to be quickly and easily mounted for handling while treating or preparing the object and which can then also be used to mount the object to a mounting surface for display. In particular, a mounting system and method is needed that greatly simplifies and facilitates the handling, painting, treating, mounting, and hanging of a fish or other animal prepared by a taxidermist or other objects which need to be handled such as carvings, etc. A mounting system and method is needed that allows the object to be easily handled while painting or air-brushing and final mounting without having to wait for the object to dry. A mounting system and method is also needed that allows the object to be easily mounted for display in different orientations on a display member without damaging the object or affecting the painting or preparation of the object.

SUMMARY OF THE INVENTION

The present invention features a mounting device and method used to both handle an object and to mount the object to a mounting surface. The mounting device comprises a mounting base portion having at least a first and a second end, for mounting to the mounting surface. At least one object engaging member extends from the first end of the mounting base portion, for engaging with the object. An elongated member extends from the second end of the mounting base portion, for allowing the object to be handled, positioned and held, and for extending through the mounting surface allowing the mounting base portion to engage with the mounting surface to mount the object to the mounting surface.

The preferred embodiment of the mounting base portion includes a mounting plug, for at least partially being received into a recessed region in the mounting surface. The mounting base portion also preferably includes an object support member proximate the first end of the mounting base portion, for abutting and supporting a surface of the object when the object engaging member is engaged with the object. The object support member preferably includes at least one object engaging member receiving region, for receiving one or more additional object engaging members adapted to be engaged with the object and mount the object to the object support member.

The preferred embodiment of the object engaging member is a threaded engaging member, for threadably engaging the object. The object engaging member also preferably extends generally from a central region of the mounting base portion.

The preferred embodiment of the elongated member is a rod extending from the second end of the mounting base portion. The elongated member preferably includes a fastener engaging region proximate the second end of the mounting base portion, for engaging with a fastener to mount the mounting base portion to the mounting surface. One embodiment of the fastener engaging region is a threaded region on the elongated member, for receiving a threaded fastener. The preferred embodiment of the mounting device includes an elongated member with gripping regions, for gripping by a user during handling and mounting of the object.

The present invention also feature a mounting system comprising a mounting device as defined above and at least one hanger, adapted to be received on and fastened to the elongated member of the mounting device, for hanging the object mounted to the mounting surface. The mounting system preferably includes a fastener, adapted to be received on the elongated member, for fastening the mounting base portion to the mounting surface and for fastening the hanger to the elongated member. The preferred embodiment of the elongated member of the mounting device used in the mounting system is adapted to be cut proximate the hanger, for allowing the object mounted to the mounting surface to hang on a substantially flat surface.

The present invention also features a method of mounting an object to a display member using a mounting device according to the present invention. The method includes a mounting base portion having at least first and second ends and an elongated member extending from the second end of the mounting base portion. The method comprises the steps of: securing the object to the mounting base portion; handling the object secured to the mounting base portion using the elongated member; inserting the elongated member through an aperture in the display member; and mounting the mounting base portion to the display member such that the object is mounted proximate a first side of the display member.

According to the preferred method, the step of mounting the mounting base portion to the display member includes engaging the mounting base portion with a recess in the first side of the display member. The step of mounting the mounting base portion also preferably includes engaging a fastener with the elongated member and against a second side of the display member to secure the object against the first side of the display member.

One example of the mounting method further includes the step of providing a hanger proximate a second side of the display member, for hanging the object mounted to the first side of the display member. The preferred method includes receiving the hanger on the elongated member and fastening the hanger to the second side with a fastener engaged with the elongated member. The preferred method also includes the step of cutting the elongated member proximate the hanger to allow the display member to hang against a substantially flat surface.

According to one method of mounting an object, the object includes an animal prepared by a taxidermist. One example of handling the object includes treating or painting the object. One example of the display member includes a piece of driftwood or a plaque.

DESCRIPTION OF THE DRAWINGS

These and other features and advantages of the present invention will be better understood by reading the following detailed description, taken together with the drawings wherein:

FIG. 2 is a side view of a mounting device, according to one embodiment of the present invention, mounting a fish for handling;

FIG. 3 is a side view of a mounting device, according to one embodiment of the present invention, mounting a fish and held in a holder;

DETAILED DESCRIPTION OF THE PREFERRED EMBODIMENT

Figure 1:
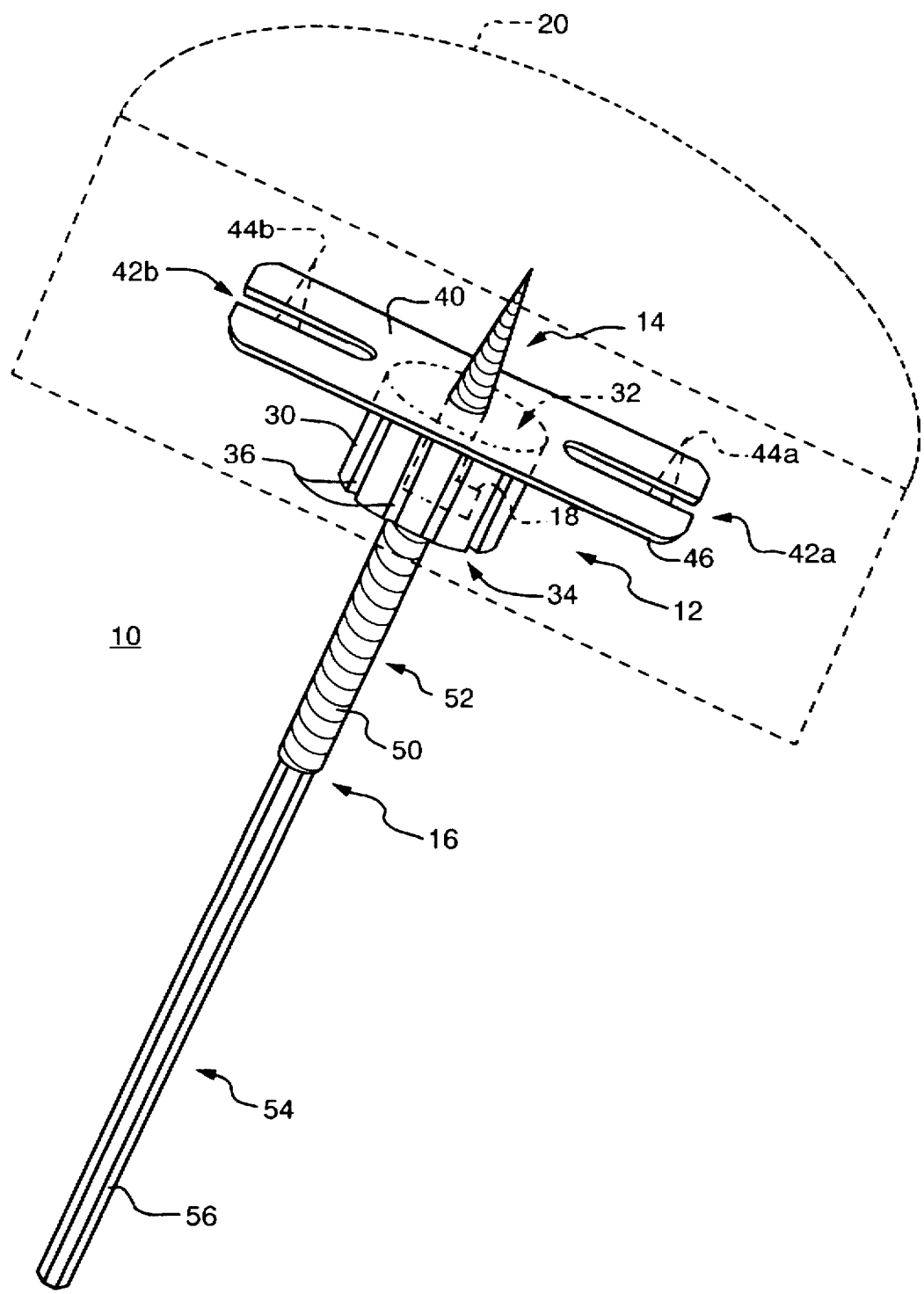
FIG. 1 is a side perspective view of a mounting device, according to the present invention.

A mounting system and method according to the present invention includes a mounting device 10, FIG. 1, used to mount an object 20 for handling, preparing, treating, painting, hanging, displaying, and the like. The mounting device 10 allows the object 20 to be mounted for handling the object while painting, air-brushing, applying lacquer, carving, or otherwise treating or preparing the object. The mounting device 10 also facilitates mounting the object 20 to a mounting surface for hanging or displaying the object 20.

According to the exemplary embodiment described in greater detail below, the mounting device 10 is useful in the taxidermy field as a system and method for mounting a fish or other animal prepared by a taxidermist. The mounting device 10, however, is not to be limited to this field of use. The present invention also contemplates using the mounting system and method of the present invention to handle and mount other objects including, but not limited to, woodcarvings, sculptures, and other decorative objects or objects to be displayed.

The mounting device 10 includes a mounting base portion 12 that supports the object 20 during handling and mounting to a mounting surface, at least one object engaging member 14 that engages with and secures the object 20 to the mounting device 10. An elongated member 16 facilitates handling of the object 20 and mounting the object 20 to a mounting surface. The mounting base portion 12 and elongated member 16 are preferably formed from a molded fiberglass or other suitable material.

The object engaging member 14 is preferably a threaded engaging member, such as a self-tapping wood screw, molded into the material of the mounting base portion 12. One example of the object engaging member 14, such as a self-tapping wood screw has a length within the range of about ¾ inches to 2 inches depending on the size of the mounting plug 30. The object engaging member 14 preferably includes an extension or "head" 18 molded within the material of the mounting base portion 12, to prevent stripping or slippage of the object engaging member 14 with respect to the mounting base portion 12 when the object engaging member 14 is engaged with the object 20.

A preferred embodiment of the mounting base portion 12 includes a mounting plug 30 that can be grasped by a user to handle the object 20 and that is also adapted to be received into a recessed region in a mounting surface, as will be described in greater detail below. The mounting plug 30 can include one or more gripping elements or regions 36, such as grooves formed in the mounting plug 30, that facilitate gripping, handling and maneuvering of the mounting plug 30. The mounting plug 30 has a first end 32 from which the object engaging member 14 extends and a second end 34 from which the elongated member 16 extends.

One example of the mounting plug 30 has a length in the range of about one ½ to 2 inches and a width or diameter in the range of about ⅞ to 1½ inches. The mounting plug 30 can be a solid or hollow structure with a cylindrical, oblong, rectangular or other shape. The present invention contemplates various shapes and sizes of the mounting plug 30 depending upon the desired usage and the surface in which the mounting plug 30 is to be mounted, as will be described in greater detail below.

One preferred embodiment of the mounting base portion 12 further includes one or more object support members 40 disposed at the first end 32 of the mounting plug 30. The object support member 40 includes one or more object engaging member receiving regions 42a, 42b that receive one or more additional object engaging members 44a, 44b. The object engaging member receiving regions 42a, 42b are preferably formed as slots that allow the object engaging members 44a, 44b to engage with the object 20 at various locations along the object support member 40.

One example of the object support member 40 includes rounded edges 46 to avoid damaging the surface of the object 20 to which the object support member 40 is secured. The object support member 40 preferably has a larger surface area and smaller depth or thickness than the mounting plug 30. An example of the dimensions of the object support member 40 includes a length in the range of approximately 1 to 3 inches from the mounting plug 30 to each end of the object support member 40 and a width in the range of ½ to 2 inches. The present invention contemplates various shapes and sizes of the object support member 40 depending upon the desired application and the object which is to be mounted, as described in greater detail below.

The preferred embodiment of the elongated member 16 includes a rod 50 extending from the second end 34 of the mounting plug 30. The rod 50 preferably includes a fastener engaging region 52 and a gripping region 54. One example of the fastener engaging region 52 includes a threaded region that is adapted to receive a threaded fastener to secure the mounting base portion 12 and the object 20 to a mounting surface, as will be described in greater detail below. According to one example, the rod 50 has a length within a range of about 5–10 inches with a fastener engaging region 52 having a length within a range of about 2–4 inches. The fastener engaging region 52 of the rod 50 has a width or diameter within a range of about $^{10}/_{32}$–½ inch and the width or diameter of the remaining portion of the rod 50 is slightly less to allow a fastener to easily slide along the rod 50 to the fastener engaging region 52.

The gripping region 54 preferably includes one or more flat gripping surfaces 56, for example, forming an octagonal shape, that facilitate gripping of the rod 50. According to the preferred embodiment, the mounting rod 50, mounting plug 30, and object support member 40 are formed as one piece by molding from a fiberglass or other suitable material.

According to the exemplary mounting system and method, the mounting device 10, FIG. 2, is mounted or secured to a fish 22 or other animal prepared by a taxidermist. A fish 22, for example, typically includes a form or insert 24 disposed within the fish 22. The form or insert 24 typically includes a block 26 of wood or other suitable material within the insert 24 to receive and engage with the object engaging members 14.

When the mounting device 10 is secured to the fish 22 the taxidermist can handle the fish during painting, air-brushing, or otherwise treating or preparing the fish 22 by grasping the mounting plug 30 and/or the gripping region 56 of the rod 50. The mounting plug 30 and rod 50 allow the fish 22 or other object 20 to be easily maneuvered and moved during different stages of preparation.

One example of the mounting system includes a holder 60, FIG. 3, that holds the elongated member 16 while the fish 22 or other object 20 is painted, air-brushed, or otherwise prepared or treated. The holder 60 preferably includes an elongated member receiving portion 62 that receives the elongated member 16 and a flange 64 that supports the mounting plug 30. The holder 60 also includes a clamp 66 that clamps to a table, workbench or other stable surface so that the mounting device 10 and the object 20 are held stable during treatment or preparation of the object 20. After the fish 22 or other type of object 20 is air-brushed, painted, or otherwise prepared or treated, the fish 22 or object 20 is ready to, and can be immediately mounted for hanging or displaying so as to prevent damage to the object.

Figure 4:
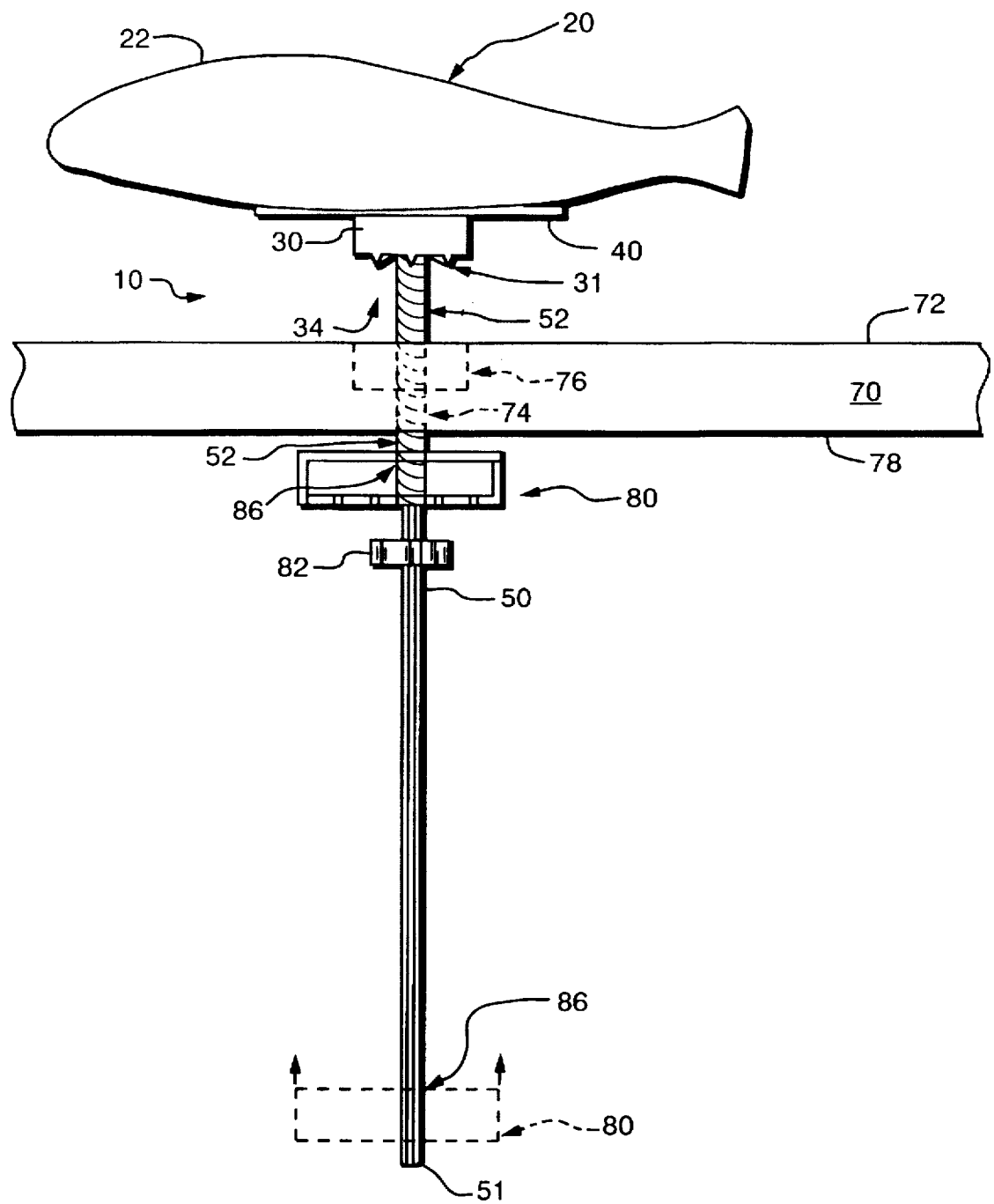
FIG. 4 is a side view of a system and method for mounting an object to a display member, according to one embodiment of the present invention.

When mounting an object 20, FIG. 4, for display, the mounting device 10 is mounted directly to a display member 70 having a mounting or first surface 72 on which the object 20 is displayed. The exemplary display members 70 include plaques, pieces of driftwood, or other similar display members used to display objects 20, such as fish 22 or other animals prepared by a taxidermist. The display member 70 includes an aperture 74 that receives the mounting rod 50 and a recessed region 76 that receives at least a portion of the mounting plug 30.

One example of the recessed region 76 has a shape and size that corresponds generally to the shape and size of the mounting plug 30. According to other examples, the recessed region 76 could be formed having varying depths so that the mounting plug 30 is partly or entirely disposed above the mounting surface 70 to vary the "3-D effect" of the object 20 mounted for display. The aperture 74 and recessed region 76 can be formed using conventional drilling tools.

One embodiment of the mounting plug 30 further includes one or more display member engaging portions 31 extending from the mounting plug 30 for engagement with the recessed region 76 to prevent rotation of the mounting plug 30 in the recessed region 76. One example of the display member engaging portions 31 include pointed ridges or serrations on the edge and/or second side 34 of the mounting plug that bite into the wood or other material of the display member 70 when the fastener 82 is tightened.

The mounting rod 50 is inserted through the aperture 74 from the mounting surface 72 to a rear or second surface 78 of the display member 70. One embodiment of the mounting system and method includes a hanger 80 preferably received on the mounting rod 50 and used to hang the display member 70 with the fish 22 or other object 20 mounted thereon. The hanger 80, as will be described in greater detail below, includes an aperture 86 that receives the rod 50, allowing the hanger 80 to slide from one end 51 of the rod 50 toward the fastener engaging region 52 of the rod 50 and against the rear surface 78 of the display member 70.

A fastener 82, such as a threaded nut, is also received on the mounting rod 50 to engage with the fastener engaging region 52 and secure the mounting device 10, fish 22, and hanger 80 to the display member 70. Alternatively, the aperture 86 of the hanger 80 could be threaded for engagement with threads on the fastener engaging regions 52.

The mounting device 10 can be directly mounted to the display member 70 without having to remove the fish 22 or object 20 and without having to wait until the surface of the fish 22 or object 20 is dried. The mounting plug 30 allows the fish 22 or object 20 to be easily maneuvered and oriented or positioned against the mounting surface 72. For example, by rotating the mounting plug 30 in the recessed region 76, the orientation of the fish 22 with respect to the mounting surface 70 can easily be changed allowing more flexibility and more attractive mountings.

Figure 5:
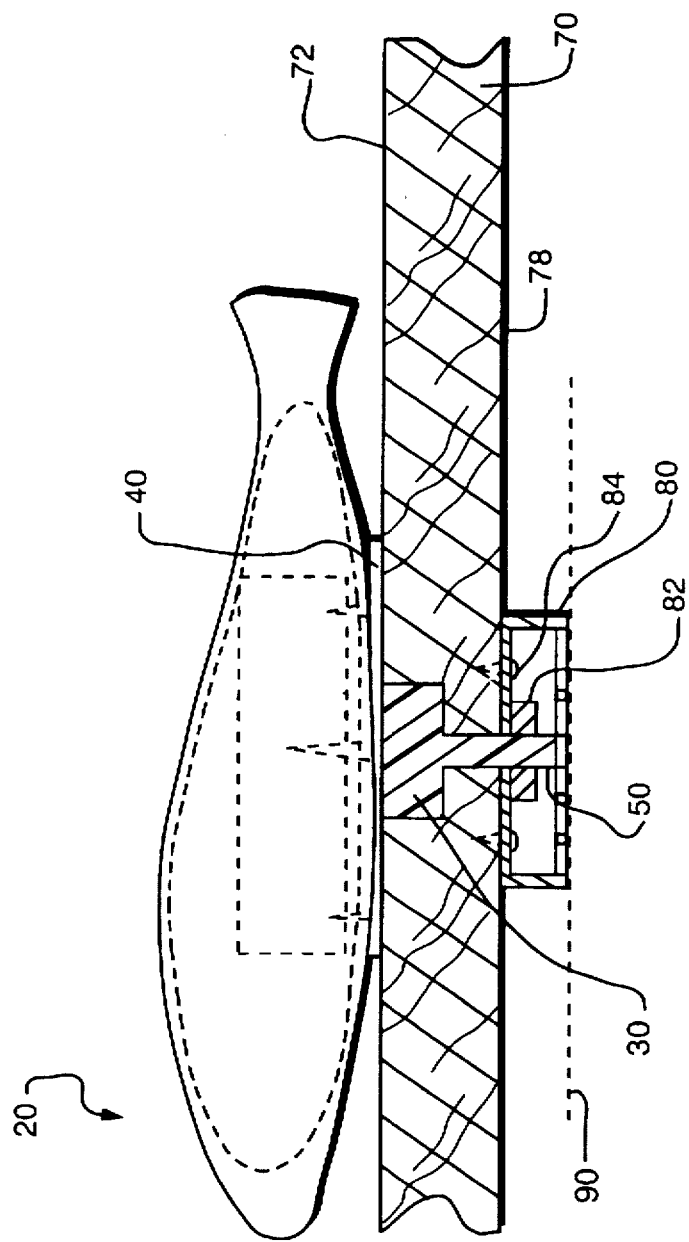
FIG. 5 is a side partial sectional view of a mounting system and method mounting an object to a display member.

The object 20, FIG. 5, is secured to the display member 70 by engaging the fastener 82 with the fastener engaging region 52 and tightening the fastener 82 until the mounting plug 30 is securely received in the recessed region 76 and the object support member 40 is secured against the mounting surface 72. If a hanger 80 is used, the hanger 80 is held against the rear surface 78 of the display member 70 by tightening the fastener 82. Additional fasteners 84, such as screws or nails, can be used as needed to further secure the hanger 80 to the display member 70. After tightening the fastener 82 and securing the object 20 to the display member 70, the mounting rod 50 is severed or cut proximate the fastener 82 such that the hanger 80 can lie against a substantially flat surface 90, such as a wall.

Figure 6B:
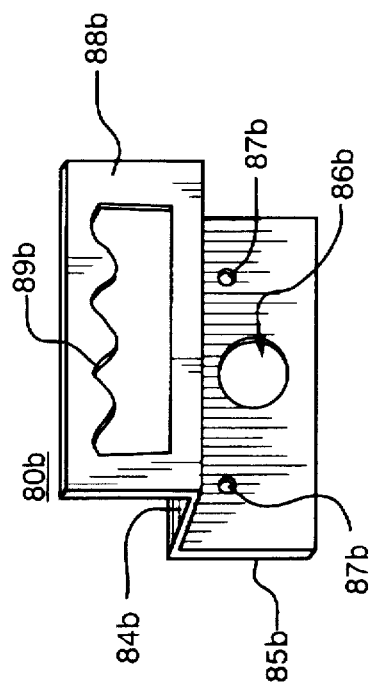
FIGS. 6A–6D are perspective views of hangers, according to two embodiments of the present invention, used to hang a display member on which the object is mounted.
Figure 6D:
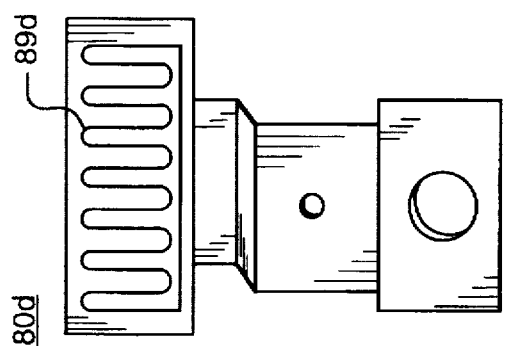
Figure 6A:
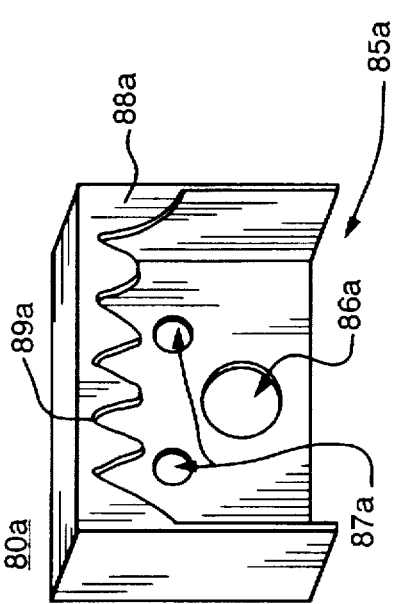

One embodiment of a hanger 80a, FIG. 6A, that can be used with the mounting device of the present invention has a rectangular or box-like construction and is molded of a nylon/fiberglass or other suitable material. The hanger 80a includes an aperture 86a that receives the rod 50 and one or more open side regions 85a that allow a severing tool, such as a saw, wire cutters or dremel tool, to cut the rod proximate the fastener. The hanger 80a can also include one or more additional apertures 87a that receive one or more additional fasteners, such as screws or nails. The hanger 80a also includes a substantially flat or planar side 88a, for lying against a substantially flat surface such as a wall. The hanger 80a further includes one or more engaging portions 89a arranged, for example, in a saw-tooth construction, for engaging a nail or similar element secured to the substantially flat surface on which the hanger 80a is hung.

Another embodiment of a hanger 80b, FIG. 6B, includes a first portion 85b having an aperture 86b that receives the rod and one or more additional apertures 87b that receive one or more additional fasteners. The hanger 80b also includes a second portion 88b having one or more engaging portions 89b that engage a nail or similar element secured to the substantially flat surface or wall on which the hanger 89b is hung. A bend 84b connects the first portion 85b offset from the second portion 88b such that the first portion 85b is disposed against the display member and the second portion 88b is disposed against the wall or flat surface. The bend 84b is preferably sufficient to allow space for a fastener engaged with the rod extending through the aperture 86b.

Figure 6C:
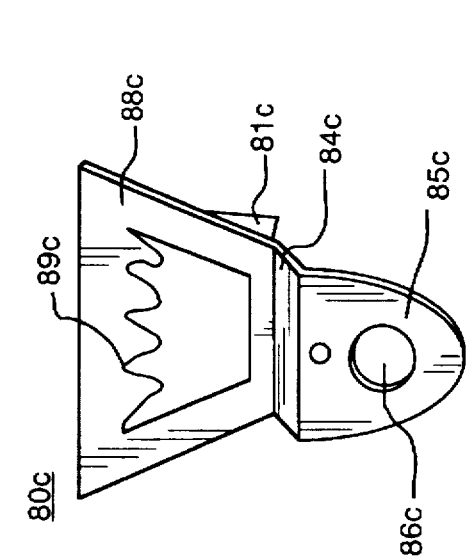

A further embodiment of the hanger 80c, FIG. 6C, has a triangular construction. A first portion 85c includes the aperture 86c for receiving a rod and a second portion 88c includes the engaging portions 89c that receive and engage one or more nails or other engaging members in a wall or flat surface. An angled bend 84c between the first and second portions 85c, 88c and one or more support stops 81c allow the hanger 80c to lie against a wall or flat surface.

Another embodiment of the hanger 80d, FIG. 6D, includes one or more long slots 89d to securely hold one or more nails or similar elements secured in a wall or flat surface. The present invention also contemplates various other types of hangers that can be secured to the display member 70 either with or without the mounting rod 50. Alternatively, the mounting device 10 can be used to mount the object 20 to a pedestal type display member 70.

The present invention contemplates various embodiments of the mounting device 10a–10d, FIGS. 7A–7D, depending upon the desired application, the type of object to be mounted and the type of display member. In one example, the mounting device 10a, FIG. 7A, includes a mounting base portion 12a having a mounting plug 30a with one or more object engaging member receiving regions 38a extending through the mounting plug 30a. This embodiment of the mounting device 10a eliminates the object support member and, instead, allows one or more additional object engaging members 44a to extend directly through the mounting plug 30a and into the object. This embodiment might be used with objects of a smaller size that require less support.

Figure 7B:
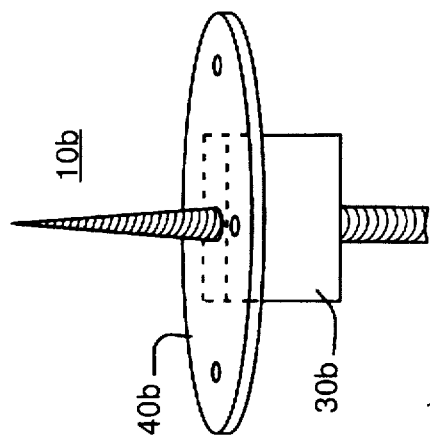
FIGS. 7A–7D are perspective views of mounting devices according to various embodiments of the present invention.

Another embodiment of the mounting device 10b, FIG. 7B, includes a mounting plug 30b and object support member 40b of alternative shapes. A square mounting plug 30b and a circular object support member 40b is shown, but the present invention contemplates mounting plugs and object support members of any possible size and shape depending upon the type of object and the type of display member. For example, a circular shaped object support member might be more desirable for a substantially circular shaped object and a shorter mounting plug might be more desirable for a more shallow display member, such as a plaque. Mounting plugs 30b of varying shapes can be mounted either on the mounting surface itself or within a recessed region of the mounting surface.

Figure 7D:
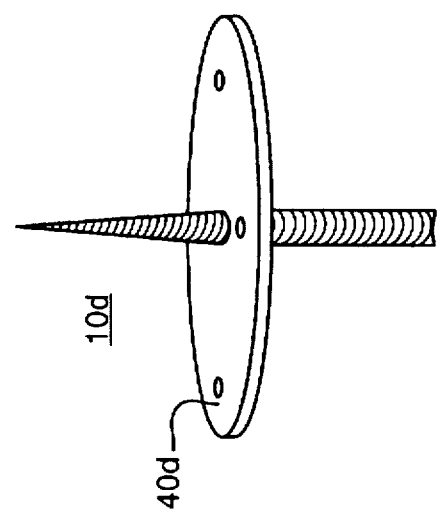
Figure 7A:
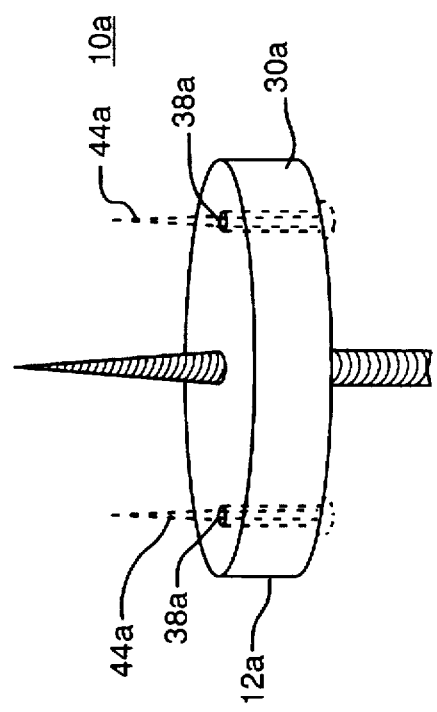
Figure 7C:
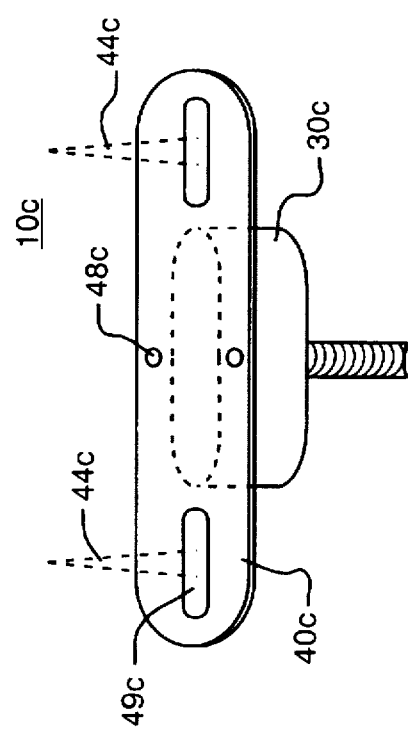

A further embodiment of the mounting device 10c, FIG. 7C includes a mounting plug 30c and object support member 40c having an oblong shape. The oblong shaped mounting plug 30c is received in a corresponding oblong shaped recessed region in a display member and would prevent the mounting device 10c from rotating with respect to the display member. The object support member 40c can include object engaging member receiving regions 48c, 49c having either a circular shape or an elongated shape. One embodiment of the mounting device 10c can have object engaging members 44c extending through each end of the object support member 40c instead of through a central region.

A further embodiment of the mounting device 10d, FIG. 7D, includes an object support member 40d without a mounting plug.

Accordingly, the mounting system and method according to the present invention allows an object to be mounted for both handling during treatment or preparation of the object and for displaying the object on a display member. The mounting system and method is particularly suited for use in the field of taxidermy to mount a fish or other animal prepared by a taxidermist so that the fish can be air-brushed or otherwise prepared while handling or maneuvering the fish with the mounting device. The fish can then be mounted to a display member, such as a plaque or driftwood, by directly mounting the mounting device to the display member without having to wait for the fish to dry. The mounting device allows the fish to easily be moved and mounted in various orientations and positions on the display member. The mounting system and method also provides for a hanger that can be easily secured to the display member using the mounting device to allow the display member and fish to be hung and displayed.

Modifications and substitutions by one of ordinary skill in the art are considered to be within the scope of the present invention which is not to be limited except by the claims which follow.

What is claimed is:

1. A mounting device, for handling an object and mounting the object to a mounting surface, said mounting device comprising:

a mounting base portion, for mounting to the mounting surface, said mounting base portion having at least a first end and a second end;

at least one object engaging member extending from said first end of said mounting base portion, for engaging with the object; and an elongated member, extending from said second end of said mounting base portion, for allowing the object to be handled, and wherein said mounting base portion extends generally outwardly from said elongated member in at least one direction in a manner that allows said elongated member to extend through the mounting surface such that said mounting base portion generally engages with the mounting surface to mount the object proximate the mounting surface.

2. The mounting device of claim 1 wherein said base portion includes a mounting plug, for at least partially being received into a recessed region in the mounting surface.

3. The mounting device of claim 2 wherein said mounting plug includes an outer gripping surface, for gripping said mounting plug during handling of said object.

4. The mounting device of claim 2 wherein said mounting base portion includes an object support member extending outwardly from said mounting plug of said mounting base portion, for abutting and supporting a surface of the object when said at least one object engaging member is engaged with the object.

5. The mounting device of claim 4 wherein said object support member includes at least one object engaging member receiving region, for receiving at least one additional object engaging member to be engaged with the object and mount the object to said object support member.

6. The mounting device of claim 1 wherein said at least one object engaging member is a threaded engaging member, for threadably engaging the object.

7. The mounting device of claim 6 wherein said at least one object engaging member extends generally from a central region of said mounting base portion.

8. The mounting device of claim 1 wherein said elongated member is a rod extending from said second end of said mounting base portion.

9. The mounting device of claim 1 wherein said elongated member includes a fastener engaging region proximate said second end of said mounting base portion, for engaging with a fastener to mount said mounting base portion to the mounting surface.

10. The mounting device of claim 9 wherein said fastener engaging region is a threaded region on said elongated member, for receiving a threaded fastener.

11. The mounting device of claim 1 wherein said elongated member includes a gripping region, for gripping by a user during handling and mounting of the object.

12. The mounting device of claim 11 wherein said gripping region includes a plurality of flat gripping surfaces.

13. The mounting device of claim 1 wherein said mounting base portion extends generally outwardly from said elongated member to form a generally T-shape.

14. A mounting system, for handling an object and for mounting the object to a mounting element having a mounting surface, said mounting system comprising:
   a mounting device comprising:
      a mounting base portion, for mounting to the mounting surface, said mounting base portion having at least a first end and a second end;
      at least one object engaging member, extending from said first end of said mounting base portion, for engaging with the object; and
      an elongated member, extending from said second end of said mounting base portion, for allowing the object to be handled and for extending through the mounting surface to mount said mounting base portion to the mounting surface; and
   at least one hanger, adapted to be received on and fastened to said elongated member of the mounting device, for hanging the object mounted to the mounting element.

15. The system of claim 14 further including a fastener, adapted to be received on said elongated member, for fastening said mounting base portion to the mounting surface and for fastening said at least one hanger to said elongated member.

16. The mounting system of claim 14 wherein said elongated member is adapted to be cut proximate said hanger, for allowing the object mounted to the mounting element to hang on a flat surface.

17. A method of mounting an object to a display member using a mounting device including a mounting base portion having at least first and second ends and an elongated member extending from said second end of said mounting base portion, said method comprising the steps of:
   securing said object to said mounting base portion;
   handling said object secured to said mounting base portion using said elongated member;
   inserting said elongated member through an aperture in the display member; and
   mounting said mounting base portion to said display member such that said object is mounted proximate a first side of said display member.

18. The method of claim 17 wherein said step of handling said object includes treating said object.

19. The method of claim 17 wherein said step of handling said object includes painting said object.

20. The method of claim 17 wherein said step of mounting said mounting base portion to said display member includes engaging said mounting base portion with a recess in said first side of said display member.

21. The method of claim 17 wherein said step of mounting said mounting base portion to said display member includes engaging a fastener with said elongated member and against a second side of said display member to secure said object against said first side of said display member.

22. The method of claim 17 further including the step of providing a hanger proximate a second side of said display member, for hanging said object mounted to said first side of said display member.

23. The method of claim 22 wherein said hanger is received on said elongated member.

24. The method of claim 23 further including the step of fastening said hanger to said second side of said display member with a fastener engaged with said elongated member.

25. The method of claim 23 further including the step of cutting said elongated member proximate said hanger to allow said display member to hang against a substantially flat surface.

26. The method of claim 17 wherein said object includes an animal prepared by a taxidermist.

27. The method of claim 17 wherein said object includes a fish prepared by a taxidermist.

28. The method of claim 17 wherein said display member includes at least one of a piece of driftwood and a plaque.

29. The method of claim 17 wherein said step of inserting said elongated member through an aperture in the display member includes inserting said elongated member through an aperture in a mounting surface of said display member.

30. A mounting device, for handling an object and mounting the object to a mounting surface, said mounting device comprising:
   a mounting base portion, for mounting to the mounting surface, said mounting base portion including:
      a mounting plug, for at least partially being received into a recessed region in the mounting surface, said mounting base portion having at least a first end and a second end; and
      an object support member extending generally outwardly from said first end of said mounting plug in at least one direction, for abutting and supporting a surface of the object; and
   an elongated member, extending from said second end of said mounting plug, for allowing the object to be handled and for extending through the mounting surface allowing said mounting plug to be received into the recessed region in the mounting surface to mount the object proximate the mounting surface.

31. The mounting device of claim 30, further including at least one object engaging member extending from said first end of said mounting plug, for engaging with the object.

32. The mounting device of claim 31 wherein said object support member includes at least one object engaging member receiving region, for receiving at least one additional object engaging member to be engaged with the object and mount the object to said object support member.

33. The mounting device of claim 32 wherein said elongated member includes a fastener engaging region proximate said second end of said mounting plug, for engaging with a fastener to mount said mounting base portion to the mounting surface.

34. The mounting device of claim 33 wherein said elongated member includes a gripping region, for gripping by a user during handling and mounting of the object.

35. The mounting device of claim 34 wherein said fastener engaging region is a threaded region of said elongated member, for receiving a threaded fastener.

36. The mounting device of claim 35 wherein said gripping region includes a plurality of flat gripping surfaces.

* * * * *